(12) United States Patent
Shinada

(10) Patent No.: US 7,180,689 B2
(45) Date of Patent: Feb. 20, 2007

(54) LENS TUBE OF MICROSCOPE

(75) Inventor: Nobuhiro Shinada, Kanagawa-Ken (JP)

(73) Assignee: Nikon Corporation, Tokyo (JP)

( * ) Notice: Subject to any disclaimer, the term of this patent is extended or adjusted under 35 U.S.C. 154(b) by 190 days.

(21) Appl. No.: 10/968,334

(22) Filed: Oct. 20, 2004

(65) Prior Publication Data

US 2005/0088731 A1 Apr. 28, 2005

(30) Foreign Application Priority Data

Oct. 27, 2003 (JP) ............................. 2003-366236

(51) Int. Cl.
  *G02B 7/02* (2006.01)
  *G02B 21/18* (2006.01)
  *G02B 21/00* (2006.01)

(52) U.S. Cl. .................. 359/826; 359/381; 359/372; 359/822

(58) Field of Classification Search ................ 359/826
  See application file for complete search history.

(56) References Cited

U.S. PATENT DOCUMENTS 6,088,155 A 7/2000 Tandler et al. .............. 359/381

6,462,771 B1* 10/2002 Kitagawa .................... 348/79
6,594,076 B2* 7/2003 Satou ......................... 359/388
7,002,738 B2* 2/2006 Sturgis et al. .............. 359/384
2004/0061936 A1* 4/2004 Morita ........................ 359/462

FOREIGN PATENT DOCUMENTS

JP 3318014 6/2002

* cited by examiner

*Primary Examiner*—Jordan Schwartz
*Assistant Examiner*—Jessica Stultz
(74) *Attorney, Agent, or Firm*—Miles & Stockbridge PC

(57) ABSTRACT

A lens tube of a microscope includes a plurality of observation ports, and first and second optical path switching portions that move relative to each other for switching an optical path to an arbitrary one of the observation ports. The first optical path switching portion can switch for guiding light from a specimen to the second optical path switching portion through a first optical element of the first optical path switching portion, or for guiding the light to the second optical path switching portion iwthout passing through the first optical element. The second optical path switching portion can switch for guiding the light from the first optical path switching portion to an arbitrary one of the observation ports through a second optical element of the second optical path switching portion, or for guiding the light to an arbitrary one of the observation ports without passing through the second optical element.

6 Claims, 6 Drawing Sheets

LENS TUBE OF MICROSCOPE

This application claims the benefit of Japanese Patent application No. 2003-366236 which is hereby incorporated by reference.

BACKGROUND OF THE INVENTION

1. Field of the Invention

The present invention relates to a lens tube of a microscope having a plurality of observation ports, and particularly, to optical path switching means to an observation port.

2. Related Background Art

Conventionally, a lens tube of a microscope having a plurality of observation ports is secured to the main body of the microscope through a circular dovetail, and an optical path switching unit for switching optical paths for a light coming from the main body of the microscope is provided above the circular dovetail. The optical path switching unit has a slide member which is supported to be movable by a guide, and this slide member is provided with three through holes for passing the light coming from the main body of the microscope therethrough. A prism is secured to each of the through holes. An operational lever for moving the slide member is secured to this slide member. It is arranged such that this operational lever is operated to switch to three observation ports to cause the light from the main body of the microscope to enter (see Japanese Patent No. 3318014, for example, FIG. 1).

However, the optical path switching unit of the lens tube of a microscope disclosed in Japanese Patent No. 3318014 requires a space for at least five optical paths including a retreat space of optical members only for sliding the slide member in the lateral direction when the optical path is switched to the three observation ports, which disadvantageously results in an increased size of the system.

In consideration of the above problem, an object of the present invention is to provide a lens tube of a microscope having a small-sized optical path switching means.

SUMMARY OF THE INVENTION

In order to achieve the above object, according to the present invention, there is provided a lens tube of a microscope comprising: a plurality of observation ports; and first and second optical path switching means to be moved relatively to each other for switching an optical path to an arbitrary one of the observation ports upon the relative movement, wherein the first optical path switching means is capable of switching for guiding light from a specimen to the second optical path switching means trough a first optical element owned by the first optical path switching means upon the relative movement or for guiding the light to the second optical path switching means without passing through the first optical element; and wherein the second optical path switching means is capable of switching for guiding light from the first optical path switching means to an arbitrary one of the observation ports through a second optical element owned by the second optical path switching means upon the relative movement, or for guiding the light to an arbitrary one of the observation ports without passing through the second optical element.

According to the present invention, there is also provided a lens tube of a microscope comprising a plurality of observation ports and optical path switching means having optical elements for switching an optical path to the observation ports, wherein: the optical path switching means comprises: at least one lower holding member for holding the optical elements; a lower guide shaft for supporting the lower holding member to be movable; lower moving means for moving the lower holding member along the lower guide shaft; at least one upper holding member provided above the lower holding member to hold the optical elements; an upper guide shaft for supporting the upper holding member to be movable in the same direction as the lower holding member; upper moving means for moving the upper holding member along the upper guide shaft; and respective driving means for driving the lower moving means and the upper moving means.

According to the present invention, there is further provided a lens tube of a microscope comprising a plurality of observation ports and optical path switching means having optical elements for switching an optical path to the observation ports, wherein: the optical path switching means comprises: at least one lower holding member for holding the optical elements; a lower guide shaft for supporting the lower holding member to be movable; lower moving means for moving the lower holding member along the lower guide shaft; at least one upper holding member provided above the lower holding member to hold the optical elements; an upper guide shaft for supporting the upper holding member to be movable in the same direction as the lower holding member; upper moving means for moving the upper holding member along the upper guide shaft; interlocking means for interlocking the movements by the lower moving means and the upper moving means along the lower guide shaft and the upper guide shaft with each other; and driving means for driving the lower moving means or the upper moving means, respectively.

In the lens tube according to the present invention, it is preferable that the lower moving means comprises a lower cam follower which is disposed on the lower holding member and a lower cylindrical cam having a lower cam groove which is engaged with the lower cam follower and that the upper moving means comprises an upper cam follower which is disposed on the upper holding member and an upper cylindrical cam having an upper cam groove which is engaged with the upper cam follower.

Also in the lens tube according to the present invention, it is preferable that the driving means is coupled to the lower cylindrical cam or the upper cylindrical cam.

Also in the lens tube according to the present invention, it is preferable that the interlocking means comprises rotation transmitting means for interlocking a rotation of the lower cylindrical cam with a rotation of the upper cylindrical cam.

Also in the lens tube according to the present invention, it is preferable that the driving means is a motor.

According to the present invention, there is provided a microscope comprising the lens tube described above.

According to the present invention, it is possible to provide a lens tube of a microscope having small-sized optical path switching means.

BRIEF DESCRIPTION OF THE DRAWINGS

FIGS. 4A and 4B are views for showing cross-sections taken along the line X—X in FIG. 2, in which FIG. 4A shows manual driving means and FIG. 4B shows driving means employing an electric motor;

DESCRIPTION OF THE PREFERRED EMBODIMENTS

Description will be made on an embodiment of a lens tube of a microscope according to the present invention, with reference to drawings.

Figure 1:
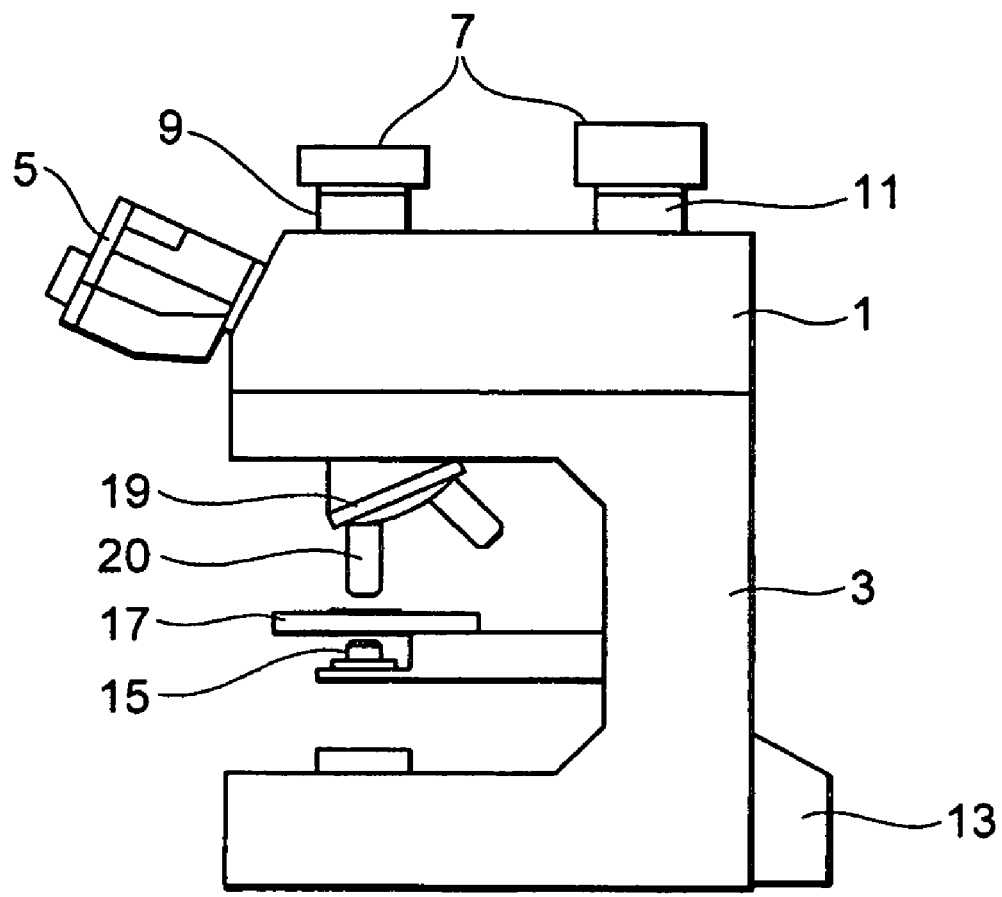
FIG. 1 is a schematic structural view of a microscope on which a lens tube for a microscope according to the present invention is mounted.
Figure 2:
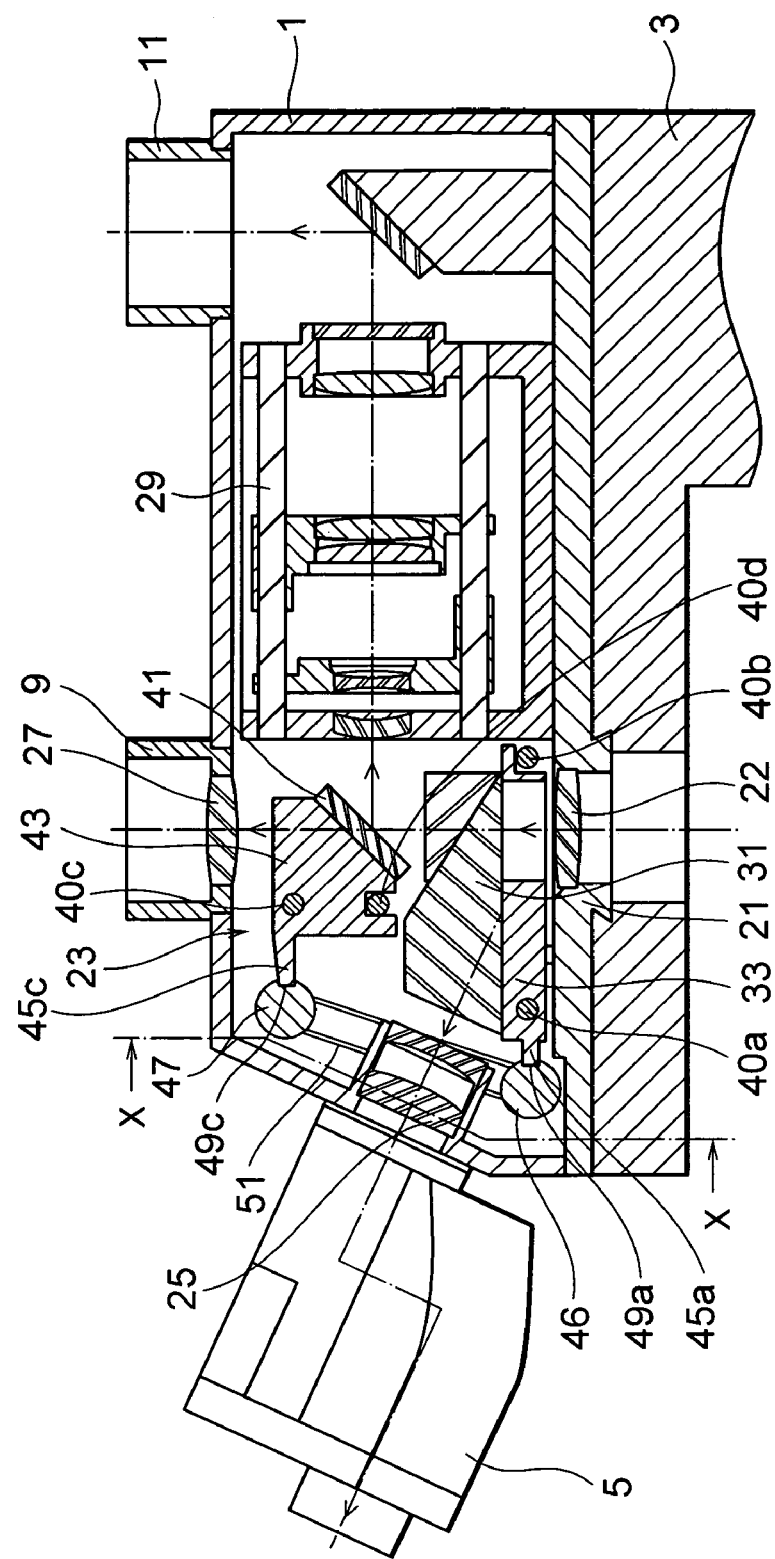
FIG. 2 is a cross-sectional view of the lens tube of the microscope having optical path switching means according to a first embodiment of the present embodiment.
Figure 3A:
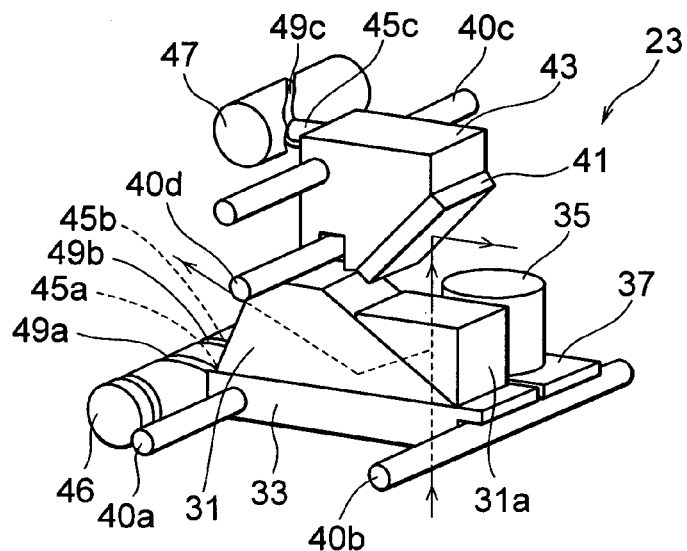
FIGS. 3A, 3B and 3C are schematic structural perspective views of the optical path switching means according to the first embodiment of the present invention, for respectively showing optical path switched states.
Figure 3B:
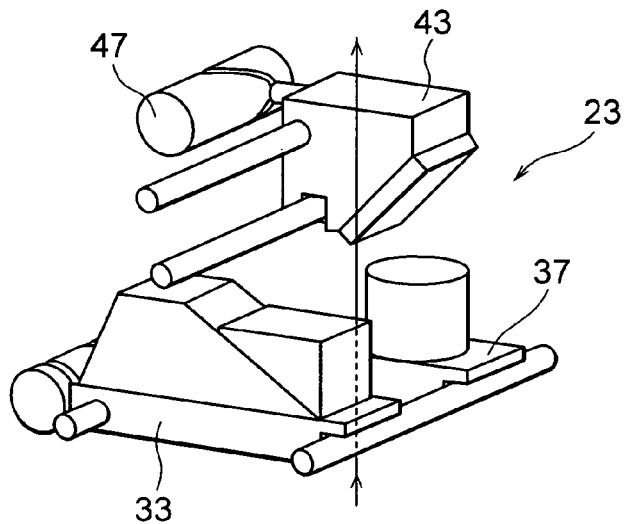
Figure 3C:
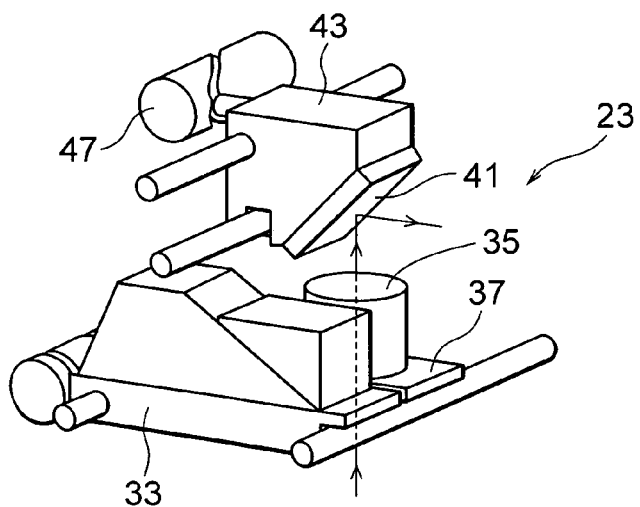
Figure 4A:
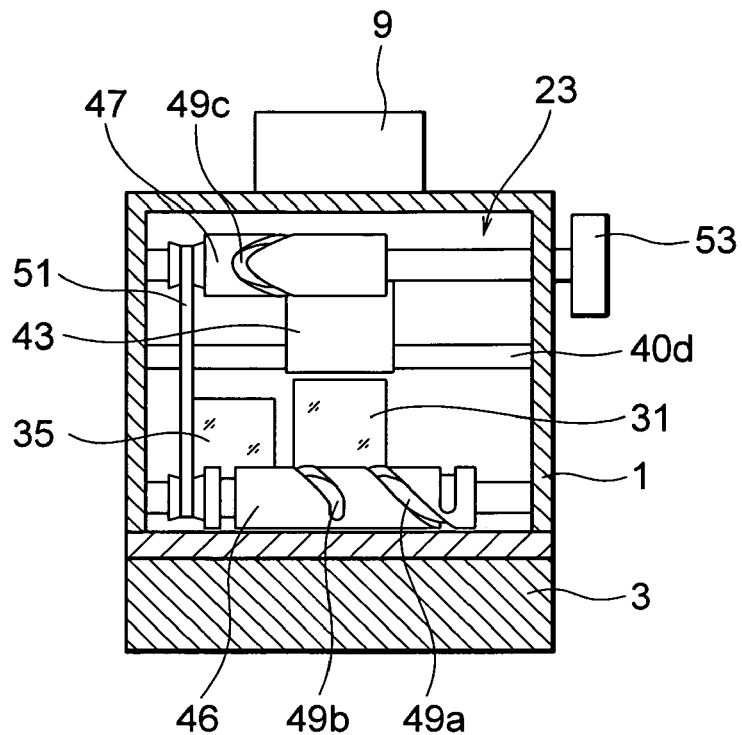
Figure 4B:
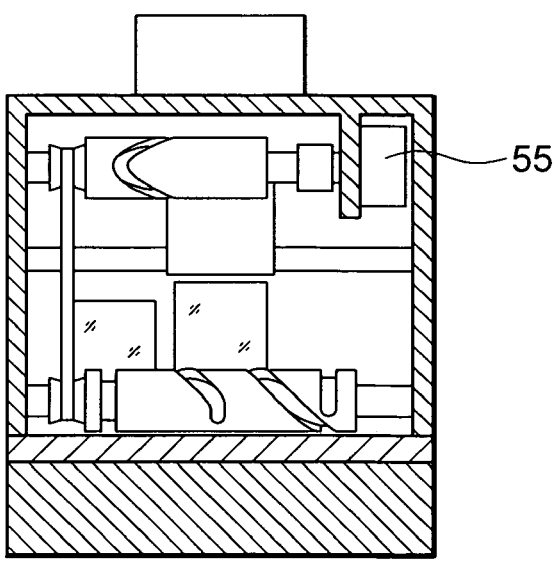
Figure 5A:
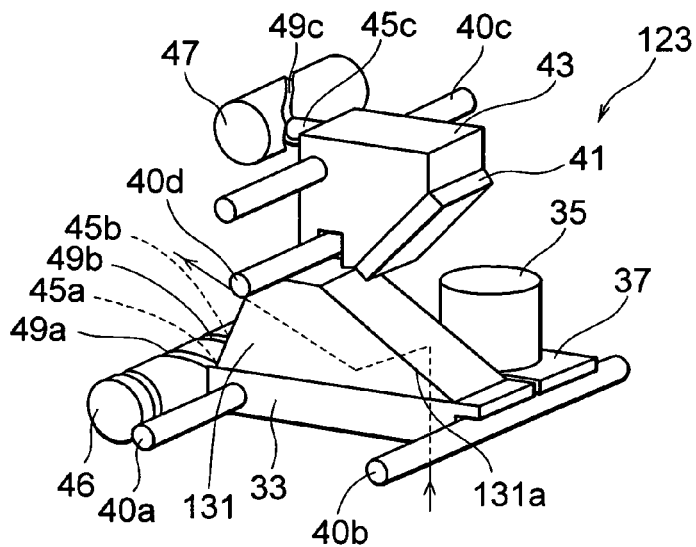
FIGS. 5A to 5C are schematic structural perspective views of the optical path switching means according to a second embodiment of the present invention, for respectively showing optical path switched states.
Figure 5B:
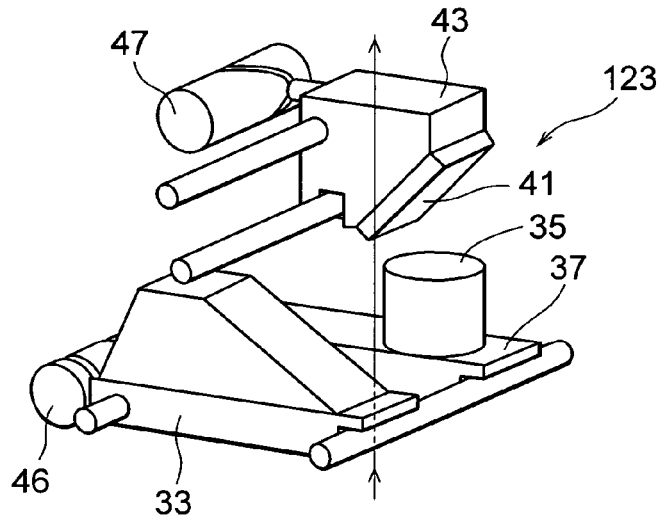
Figure 5C:
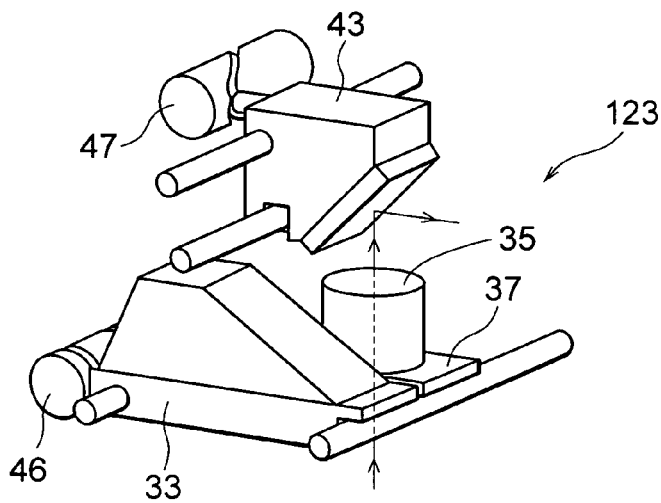
Figure 6A:
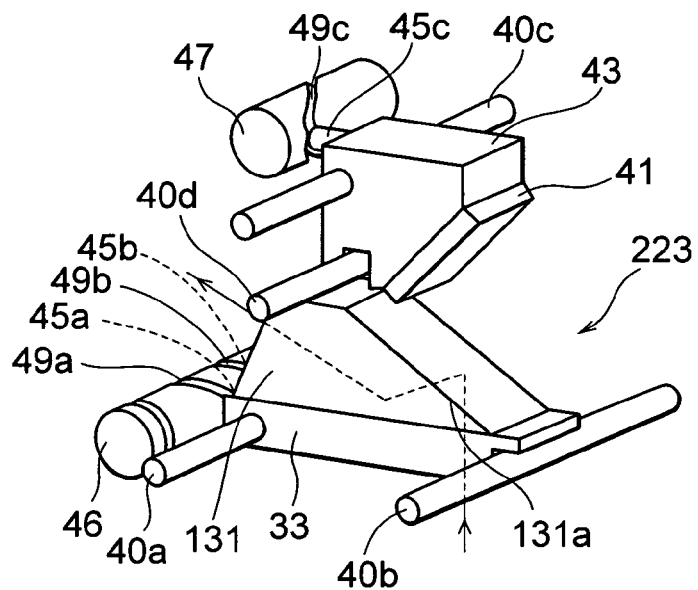
FIGS. 6A to 6C are schematic structural perspective views of the optical path switching means according to a third embodiment of the present invention, for respectively showing optical path switched states.
Figure 6B:
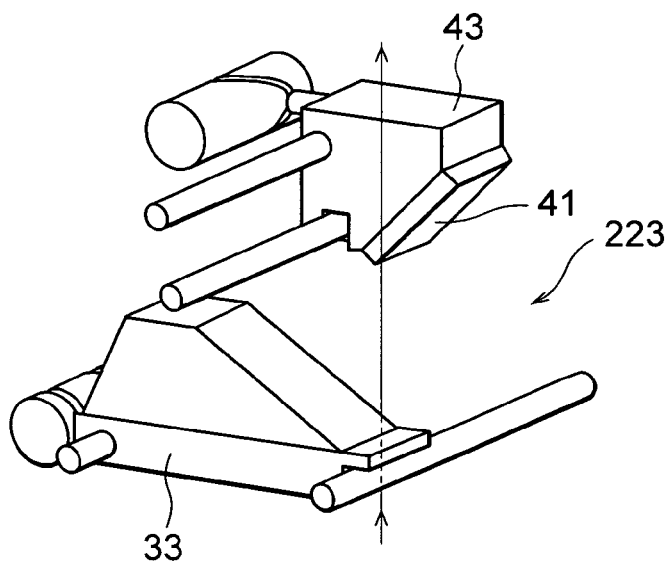
Figure 6C:
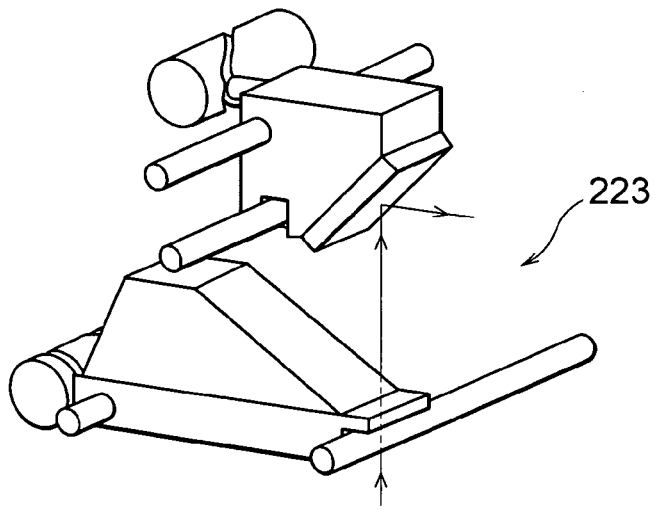

FIG. 1 is a schematic structural view of a microscope on which a lens tube of for a microscope according to the present invention is mounted. FIG. 2 is a cross-sectional view of the lens tube for a microscope having optical path switching means according to the first embodiment of the present embodiment. FIGS. 3A, 3B and 3C are schematic structural perspective views of the optical path switching means according to the first embodiment of the present invention, for respectively showing optical path switched states. FIGS. 4A and 4B are views for showing cross-sections taken along the line X—X in FIG. 2, in which FIG. 4A shows manual driving means and FIG. 4B shows driving means employing an electric motor. FIGS. 5A to 5C are schematic structural perspective views of the optical path switching means according to the second embodiment of the present invention, for respectively showing optical path switched states. FIGS. 6A to 6C are schematic structural perspective views of the optical path switching means according to the third embodiment of the present invention, for respectively showing optical path switched states.

In FIG. 1, a lens tube 1 of a microscope having an optical path switching means according to an embodiment of the present invention is provided in an upper part of the main body 3 of a microscope. The lens tube 1 of the microscope is provided with an eyepiece observation unit 5, and observation ports 9 and 11 each connected to a camera 7.

An illumination light beam from a lamp light source 13 enters a condenser lens 15 through an unrepresented illumination optical system, so as to illuminate an unrepresented specimen mounted on a stage 17. The light beam from the specimen is condensed by an objective lens 20 which is attached to a revolving nosepiece 19 and then enters the lens tube 1. The direction of the light beam entering the lens tube 1 is switched by the optical switching means which will be described later, so that the light beam can be observed by the eyepiece observation unit 5 or by an unrepresented monitor through the cameras 7 which are attached to the first observation port 9 and the second observation port 11. In this manner, a microscope on which the lens tube 1 having the optical path switching means according to the embodiment of the present invention is constituted.

(First Embodiment)

Next, description will be made on the optical path switching means of the lens tube of a microscope according to the first embodiment of the present invention.

In FIG. 2 through FIG. 4B, the lens tube 1 is connected to the microscope main body 3 through a circular dovetail coupling 21. A first imaging lens 22 is secured to an upper part of the circular dovetail 21, and the optical path switching means 23 which will be described later is provided above the first imaging lens 22. A light beam which has passed through the first imaging lens 22 from the microscope main body 3 and has been deflected leftward in FIG. 2 by the optical path switching means 23 passes through the second imaging lens 25 to advance to the eyepiece observation unit 5. The light beam passing through the optical path switching means 23 progresses upward in FIG. 2, and passes through the third imaging lens 27 to advances to the first observation port 9. The light beam deflected rightward in FIG. 2 by the optical path switching means 23 passes through a zooming optical system 29 to advance to the second observation port 11.

As shown in FIGS. 3A, 3B and 3C, the optical path switching means 23 is provided with a first holding member 33, which is one of lower holding members, for holding an optical element constituted by a prism 31 and a prism 31a for discoloration and for adjustment of an optical path length bonded to each other and a second holding member 37 serving as the other of the lower holding members for holding a cylindrical glass 35 for adjusting the optical path length. The first and second holding members 33 and 37 are independently supported to be movable by guide shafts 40a and 40b, respectively, so as to be movable in a range of the length of the guide shaft 40a or 40b. Above the lower holding members, a third holding member 43 serving as an upper holding member for holding a mirror 41 is supported to be movable by the guide shafts 40c, 40d which are provided substantially parallel to the guide shafts 40a, 40b. The guide shafts 40a, 40b and the guide shafts 40c, 40d are respectively secured to the lens tube 1 to be parallel to each other, and the length of each of the guide shafts is not greater than the width of the lens tube in the lateral direction, seen from the front of the lens tube 1.

A cam follower 45a is provided at an end of the first holding member 33, a cam follower 45b (not shown) at an end of the second holding member 37, and a cam follower 45c at an end of the third holding member 43, respectively. Cam grooves 49a, 49b are formed on a first cylindrical cam 46. The cam follower 45a is engaged with the cam groove 49a, the cam follower 45b with the cam groove 49b, and the cam follower 45c with a cam groove 49c formed on a second cylindrical cam 47, respectively.

As shown in FIGS. 4A and 4B, the first cylindrical cam 46 and the second cylindrical cam 47 are coupled to each other by a timing belt 51 for interlocking rotations of the both cams. A switch dial 53 of driving means for driving the cylindrical cams 46, 47 is provided at one end of the second cylindrical cam 47. When the switch dial 53 is rotated, the second cylindrical cam 47 rotates, and the first cylindrical cam 46 also rotates in an interlocking manner with a rotation of the second cylindrical cam 47 through the timing belt 51.

Upon rotations of the first cylindrical cam 46 and the second cylindrical cam 47, the first to third holding members 33, 37 and 43 are moved along the guide shafts 40a to 40d, respectively, through the cam followers 45a, 45b and 45c respectively engaged with the corresponding cam grooves 49a, 49b and 49c, whereby the optical elements provided on the respective holding members are moved. The moving positions of the optical elements are controlled by the cam grooves 49a, 49b and 49c. The optical path switching means is thus constituted.

Note that the means for interlocking rotations of the first cylindrical cam 46 and the second cylindrical cam 47 is not limited to the timing belt 51, but may be another member such as a gear. Also, as the driving means for driving each of the cylindrical cams, an electric motor 55 as shown in FIG. 4B may be employed, instead of the switch dial 53. By the use of the electric motor 55, switching of the optical paths to each observation port can be performed easily by operating an unrepresented switch. It is also possible to provide the driving means on the side of the first cylindrical cam 46.

According to the first embodiment, it is rendered possible to provide the respective optical elements at the predetermined positions by rotating the switch dial 53 or the electric motor 55 which serves as the driving means.

Description will be made below on the layout of the optical elements (holding members) and an optical path switch state.

FIG. 3A shows a state in which the switch dial 53 is operated so that the first holding member 33 and the third holding member 43 are disposed on an optical path while the second holding member 37 is outside the optical path, and the prisms 31 and 31a and the mirror 41 are disposed on the optical path. A light beam from the first imaging lens 22 is divided by the prisms 31 and 31a into a leftward one and an upward one in the drawing. The light beam deflected leftward advances to the eyepiece observation unit 5 shown in FIG. 2, so as to be observed by an observer. The light beam advancing upward is deflected rightward in the drawing by the mirror 41 and passes through the zooming optical system 29 shown in FIG. 2 to enter the second observation port 11 at which the light beam is subjected to image pickup by the camera 7 (FIG. 1) to be observed by an unrepresented monitor or the like. In this manner, it becomes possible to observe an image both by the eyepiece observation unit 5 and the second observation port 11 at the same time.

FIG. 3B shows a state in which the switch dial 53 is operated so that all of the first to third holding members 33, 37 and 43 are retracted from the optical path. A light beam from the first imaging lens 22 progresses upward as it is without passing any prism or mirror of the optical path switching means 23 to enter the first observation port 9 shown in FIG. 2, at which the light beam is image-picked up by the camera 7 (FIG. 1) and then is observed by the unrepresented monitor or the like.

FIG. 3C shows a state in which the switch dial 53 is operated so that the first holding member 33 is retracted from the optical path, and the second and third holding members 37 and 43 are disposed on the optical path. A light beam from the first imaging lens 22 is transmitted through the cylindrical glass 35 for adjusting the optical path length, is deflected rightward in the drawing by the mirror 41, and is passed through the zooming optical system 29 shown in FIG. 2 to enter the second observation port 11 at which the light beam is image-picked up by the camera 7 (FIG. 1) and then observed by the unrepresented monitor or the like. Differing from the state in FIG. 3A, all of the light beams from the first imaging lens 22 is reflected by the mirror 41 and then enter the second observation port 11 so that a brighter image can be picked up by the camera 7.

In the first embodiment, the second cylindrical cam 47 is rotated by the use of the switch dial 53 or the electric motor 5 provided on the optical path switching means 23, the first cylindrical cam 46 is rotated through the timing belt 51, and the first to third holding members 33, 37 and 43 are moved onto or retracted from the optical path through the cam followers 45a, 45b and 45c engaged with the cam grooves 49a, 49b and 49c, respectively, whereby light beam entering from the microscope main body 3 through the first imaging lens 22 can be switched to the eyepiece observation unit 5, the first observation port 9 and the second observation port 11. A space required for the optical path switching means may include the spaces for the first and second holding members 33 and 37 and a retreat space, so that the optical path switching means 23 can be formed with a smaller space in the moving direction of the optical path switching means, compared with the conventional switching means.

(Second Embodiment)

Next, description will be made on an optical path switching means of a lens tube of a microscope according to the second embodiment of the present invention. The second embodiment is different from the first embodiment in that a bonding surface between the prism 31 and the prism 31a is replaced by a mirror 131a and the prism 31a is removed. Other arrangements are the same as those in the first embodiment and are given the same referential numerals and symbols, and the description thereof will be omitted.

FIG. 5A shows a state in which the switch dial 53 is operated so that the first holding member 33 and the third holding member 43 are disposed on the optical path while the second holding member 37 is outside the optical path, and a prism 131 is disposed on the optical path. In an optical path switching means 123 according to the second embodiment, a light beam from the first imaging lens 22 enters the mirror 131a of the prism 131 and is totally reflected by the mirror 131a so as to be deflected leftward in the drawing to enter the eyepiece observation unit 5 shown in FIG. 2, at which the light beam is observed by the observant.

FIG. 5B shows a state in which the switch dial 53 is operated so that all of the first to third holding members 33, 37 and 43 are retracted from the optical path. A light beam from the first imaging lens 22 passes through the optical path switching means 123 as it is to progress upward to enter the first observation port 9 shown in FIG. 2, at which the light beam is image-picked up by the camera 7 (FIG. 1) to be observed by the unrepresented monitor or the like.

FIG. 5C shows a state in which the switch dial 53 is operated so that the first holding member 33 is retracted from the optical path, and the second and third holding members 37 and 43 are disposed on the optical path. A light beam from the first imaging lens 22 is transmitted through the cylindrical glass 35 for adjusting the optical path length, is deflected rightward in the drawing by the mirror 41 to pass through the zooming optical system 29 shown in FIG. 2, and then enters the second observation port 11, at which the light beam is image-picked up by the camera 7 (FIG. 1) and then observed by the unrepresented monitor or the like.

The optical path switching means 123 according to the second embodiment of the present invention can switch the light beam from the first imaging lens 22 to the eyepiece observation unit 5, the first observation port 9 and the second observation port 11 so that all of the incident light beam can be directed to the corresponding ports. Other arrangements and effects are the same as those in the first embodiment and the description thereof will be omitted.

(Third Embodiment)

Next, description will be made on an optical path switching means of a lens tube of a microscope according to the third embodiment of the present invention. The third embodiment is different from the second embodiment in that the cylindrical glass 35 and the second holding member 37 with the cylindrical glass 35 mounted thereon are removed.

Other arrangements are the same as those in the second embodiment and are given the same referential numerals and symbols, and the description thereof will be omitted.

FIG. 6A shows a state in which the switch dial 53 is operated so that the first holding member 33 and the third holding member 43 are disposed on the optical path and a prism 131 is disposed on the optical path. In an optical path switching means 223 according to the third embodiment, a light beam from the first imaging lens 22 enters the mirror 131a of the prism 131 and is totally reflected by the mirror 131a to be deflected leftward in the drawing to enter the eyepiece observation unit 5 shown in FIG. 2, at which the light beam is observed by the observant.

FIG. 6B shows a state in which the switch dial 53 is operated so that all of the first holding member 33 and the third holding members 43 are retracted from the optical path. A light beam from the first imaging lens 22 passes through the optical path switching means 223 as it is and progresses upward to enter the first observation port 9 shown in FIG. 2, at which the light beam is image-picked up by the camera 7 (FIG. 1) and is observed by the unrepresented monitor or the like.

FIG. 6C shows a state in which the switch dial 53 is operated so that the first holding member 33 is retracted from the optical path and the third holding member 43 is disposed on the optical path. A light beam from the first imaging lens 22 is deflected rightward in the drawing by the mirror 41 to pass through the zooming optical system 29 shown in FIG. 2, and then enters the second observation port 11, at which the light beam is image-picked up by the camera 7 (FIG. 1) and then observed by the unrepresented monitor or the like.

Since requiring no cylindrical glass for adjusting the optical path length, the optical path switching means 223 according to the third embodiment of the present invention can be manufactured at a lower cost because of the reduced constituted parts thereof. Other arrangements and effects are the same as those in the second embodiment and the description thereof will be omitted.

In all of the foregoing embodiments, it is arranged such that the upper moving means and the lower moving means are interlocked with each other by the timing belt to be moved relatively to each other. However, it may be arranged such that the upper and lower moving means are moved independently of each other. In this case, no interlocking member is required, and the upper and lower moving means may be respectively provided with members such as a switch dial.

In the present embodiment, the switch dial 53 is manually operated, as shown in FIG. 4A so as to move the respective holding members relative to each other. However, means for manual relative movement according to the present invention is not limited to this. Levers may be provided on the first and second optical path switching means, respectively, so as to move the respective optical path switching means along the lower and upper guide shafts independently of each other. In this case, it is effective if each lever is provided on an outer side surface of each of the first to third holding members so that the tip end portions of these levers are protruded outward from the lens tube and the protruded portions can be gripped by the user so that the user can insert or pull the levers into or out the lens tube. In this case, it is preferable that an indicative portion which indicates the positions of the levers and the layout of the optical elements is provided, for example, in the vicinity of the lever mounting portion on the outer wall of the lens tube so that the user can easily understand an inserting level or a pulling level of each lever into or from the lens tube and the positional relation among the respective optical elements. With such an indicative portion, the user can properly determine the layout of the optical elements when operating the levers by watching this indicative portion. As a result, the optical elements can be easily switched.

Note that the foregoing embodiments are merely exemplary. The present invention is not limited to the structures and configurations described above. They can be properly altered or modified within the spirit and scope of the present invention.

What is claimed is:

1. A lens tube of a microscope comprising a plurality of observation ports and optical path switching means having optical elements for switching an optical path to said observation ports, wherein:

said optical path switching means comprises:

at least one lower holding member for holding said optical elements;

a lower guide shaft for supporting said lower holding member to be movable;

lower moving means for moving said lower holding member along said lower guide shaft;

at least one upper holding member provided above said lower holding member to hold the optical elements;

an upper guide shaft for supporting said upper holding member to be movable in the same direction as said lower holding member;

upper moving means for moving said upper holding member along said upper guide shaft; and respective driving means for driving said lower moving means and said upper moving means; and wherein said lower moving means comprises a lower cam follower which is disposed on said lower holding member and a lower cylindrical cam having a lower cam groove which is engaged with said lower cam follower; and said upper moving means comprises an upper cam follower which is disposed on said upper holding member and an upper cylindrical cam having an upper cam groove which is engaged with said upper cam follower.

2. A lens tube according to claim 1, wherein said driving means is coupled to said lower cylindrical cam or said upper cylindrical cam.

3. A lens tube according to claim 2, wherein said driving means includes a motor.

4. A lens tube of a microscope comprising a plurality of observation ports and optical path switching means having optical elements for switching an optical path to said observation ports, wherein:

said optical path switching means comprises:

at least one lower holding member for holding said optical elements;

a lower guide shaft for supporting said lower holding member to be movable;

lower moving means for moving said lower holding member along said lower guide shaft;

at least one upper holding member provided above said lower holding member to hold the optical elements;

an upper guide shaft for supporting said upper holding member to be movable in the same direction as said lower holding member;

upper moving means for moving said upper holding member along said upper guide shaft;

interlocking means for interlocking the movements by said lower moving means and said upper moving means along said lower guide shaft and said upper guide shaft with each other; and driving means for driving said lower moving means or said upper moving means, respectively; and wherein said lower moving means comprises a lower cam follower which is disposed on said lower holding member and a lower cylindrical cam having a lower cam groove which is engaged with said lower cam follower; and said upper moving means comprises an upper cam follower which is disposed on said upper holding member and an upper cylindrical cam having an upper cam groove which is engaged with said upper cam follower.

5. A lens tube according to claim 4, wherein said interlocking means comprises rotation transmitting means for interlocking a rotation of said lower cylindrical cam with a rotation of said upper cylindrical cam.

6. A lens tube according to claim 4, wherein said driving means is coupled to said lower cylindrical cam or said upper cylindrical cam.

* * * * *